US009692677B2

(12) United States Patent
Keesara et al.

(10) Patent No.: US 9,692,677 B2
(45) Date of Patent: Jun. 27, 2017

(54) IMPLEMENTING MULTICAST LINK TRACE CONNECTIVITY FAULT MANAGEMENT IN AN ETHERNET NETWORK

(71) Applicant: Avaya, Inc., Basking Ridge, NJ (US)

(72) Inventors: Srikanth Keesara, Tewksbury, MA (US); Deborah Ellen Fitzgerald, Acton, MA (US)

(73) Assignee: Avaya Inc., Basking Ridge, NJ (US)

( * ) Notice: Subject to any disclaimer, the term of this patent is extended or adjusted under 35 U.S.C. 154(b) by 810 days.

(21) Appl. No.: 13/916,257

(22) Filed: Jun. 12, 2013

(65) Prior Publication Data

US 2014/0369177 A1 Dec. 18, 2014

(51) Int. Cl.
*H04W 36/00* (2009.01)
*H04L 12/26* (2006.01)

(52) U.S. Cl.
CPC .......... *H04L 43/10* (2013.01); *H04L 43/0811* (2013.01)

(58) Field of Classification Search
None
See application file for complete search history.

(56) References Cited

U.S. PATENT DOCUMENTS

| 6,839,348 | B2* | 1/2005 | Tang | H04L 12/18 370/390 |
| 2009/0232006 | A1* | 9/2009 | Mohan | H04L 43/10 370/241.1 |
| 2009/0268622 | A1* | 10/2009 | Blum | H04L 12/2697 370/252 |
| 2010/0188983 | A1* | 7/2010 | Washam | H04L 43/0811 370/245 |
| 2012/0243539 | A1* | 9/2012 | Keesara | H04L 45/66 370/392 |
| 2013/0259050 | A1* | 10/2013 | Eastlake, III | H04L 45/74 370/392 |
| 2014/0241357 | A1* | 8/2014 | Liu | H04L 45/745 370/392 |

* cited by examiner

Primary Examiner — Fan Ng

(57) ABSTRACT

Multicast link trace Connectivity Fault Management (CFM) is implemented in an Ethernet network by causing nodes on the network which perform Reverse Path Forwarding Check (RPFC) based on packet Source Address (SA) to not update the packet SA when updating the content of the CFM message. Alternatively multicast CFM is implemented by causing nodes on the network to update the packet SA when the content of the CFM message is updated, but cause a secondary RPFC process to be implemented by a control process in connection with processing the CFM message. The secondary RPFC process is based on a combination of source and content contained in the payload of the CFM message.

18 Claims, 6 Drawing Sheets

IMPLEMENTING MULTICAST LINK TRACE CONNECTIVITY FAULT MANAGEMENT IN AN ETHERNET NETWORK

CROSS-REFERENCE TO RELATED APPLICATIONS

None.

TECHNICAL FIELD

The present invention relates to Ethernet networks and, more particularly, to implementing multicast link trace connectivity fault management in an Ethernet network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

Ethernet is a well known networking protocol that has been defined by the Institute of Electrical and Electronics Engineers (IEEE) as standard 802.1 In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast or flooded on the network. A characteristic of a spanning tree is that there is only one path between any pair of destinations in the network, and therefore it was possible to "learn" the connectivity associated with a given spanning tree by watching where packets came from. However the spanning tree itself was restrictive and often led to over-utilization of the links that were on the spanning tree and non-utilization of the links that weren't part of the spanning tree.

To overcome some of the limitations inherent in Ethernet networks implementing a spanning tree, a link state protocol may be used to control how nodes on the Ethernet network implement forwarding state in connection with handling forwarding of packets on the network. In this instance, rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and can individually populate their forwarding information bases (FIBs) according to the computed view of the network. One implementation of routed Ethernet has now been standardized as IEEE 802.1aq.

In a routed Ethernet implementation, when all nodes have computed their role in the synchronized view and populated their FIBs, the network will have a loop-free unicast tree to any given bridge from the set of peer bridges (those that require communication to that bridge for whatever reason); and a both congruent and loop-free point-to-multipoint (p2mp) multicast tree from any given bridge to the same set or subset of peer bridges per service instance hosted at the bridge. The result is the path between a given bridge pair is not constrained to transiting the root bridge of a spanning tree and the overall result can better utilize the breadth of connectivity of a mesh. In essence every bridge roots one or more trees which define unicast connectivity to that bridge, and multicast connectivity from that bridge.

Examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference.

Connectivity Fault Management (CFM) has been developed to enable paths, including multicast paths, to be traced in the network. One process supported by CFM is Link Trace. A link trace procedure identifies all Messaging Intermediate Points (MIPs) and Messaging End Points (MEPs) belonging to a Messaging Entity (ME), e.g. on a particular path or multicast tree on a network.

To implement a link trace on a multicast tree, a messaging end point (MEP) initiates the procedure by sending a series of Link Trace Messages (LTM) messages using a multicast MAC DA associated with the multicast tree. Each MIP that belongs to this ME replies by generating a link trace response (LTR) unicast message which is addressed to the originating MEP. The originating MEP collects the LTRs from all the nodes to trace propagation of the link trace message through the network. This enables the originating MEP to determine the tree and identify any broken links in the case of a failure on the network.

FIGS. 1 through 4 show an example communication network with a multicast tree that is to be traced using CFM Link trace packets. As shown in FIG. 1, the example network 10 includes nodes 12, labeled 1 thorough 6, and links 14. The dark lines show the links that are intended to form the multicast tree on the example network.

FIG. 2 shows a first stage of using CFM to trace the multicast tree. As shown in FIG. 2, node 1 transmits a multicast Link Trace Message (LTM) to each of its adjacencies (nodes 2, 3, 4). Each of the nodes 2, 3, 4 will respond with a unicast Link Trace Response (LTR) message to node 1. As shown in FIG. 3, under optimal operating conditions, nodes 3 and 4 would recognize that they have no further branches on the tree and, accordingly, would not transmit the Link Trace Message. Node 2, by contrast has further branches on the multicast tree. Hence, under normal conditions, node 2 will transmit the Link Trace Message to nodes 5 and 6 according to the forwarding state for the multicast which is stored in node 2's forwarding information base. As shown in FIG. 3, upon receipt of the LTM messages, nodes 5 and 6 will send a unicast LTR message back to node 1. The LTRs sent by the nodes 2-6 are unicast messages addressed to node 1, so these messages may follow the reverse path of the multicast tree or may take another path through the network according to the shortest path forwarding state installed by the nodes on the network. For ease of explanation, FIG. 3 shows these LTR messages flowing back along the same path as the LTM messages.

FIG. 4 shows another example exchange of messages where the nodes forward link trace messages on links that are not part of the multicast tree. As shown in FIG. 4, in this example nodes 3 and 4 have forwarded messages on links that are not part of the multicast tree. Specifically, node 3 forwarded LTM messages to nodes 2 and 6, and node 4 forwarded LTM messages to nodes 2 and 5. Similarly, upon receipt, nodes 5 and 6 each forwarded LTM messages to each other. Each node, upon receipt of the LTM, forwarded a LTR message back to node 1. As shown in FIG. 4, this results in the generation of a large number of extraneous LTR messages.

One way to prevent the scenario shown in FIG. 4 is to use Reverse Path Forwarding Check (RPFC). RPFC enables a node to determine whether a message from a source has been received on a correct port. For example, comparing FIGS. 3 and 4, node 5 would expect to receive a LTM packet associated with the multicast on a port connecting itself to node 2. If, as shown in FIG. 4, node 5 were to receive an LTM packet on a port connecting it to node 4, the RPFC process will determine that the packet has been received on an incorrect port and cause the node to drop the packet. Thus, RPFC enables the nodes to squelch forwarding of incorrectly routed packets to reduce spurious transmission of Link trace messages (and other messages). Since the LTM messages will be dropped, this will also prevent the node from generating extraneous LTR messages.

There are two ways to implement RPFC in connection with multicast. A first way is to base the RPFC check on the multicast destination MAC address. Commonly, in multicast, the multicast destination MAC address encodes information identifying the source. Where RPFC is based on the multicast destination MAC address, the source information encoded by the multicast DA may be used to determine whether a multicast packet, including a link trace multicast packet, has been received on an expected port, interface, or other source.

However, not all nodes are able to implement RPFC using the multicast destination MAC address. Rather, some nodes implement RPFC using the source address, which is the field of the multicast packet identifying the source MAC address of the node that generated the packet. Unfortunately, in connection with link trace packets, each node that processes the link trace message will update the payload field of the link trace message to add information indicating that the message was relayed by the node. And, whenever a node changes the payload of the message it will automatically update the source address to identify itself as the source of the message.

Accordingly, in the scenario shown in FIG. 4, if nodes 5 and 6 are configured to perform RPFC based on the source MAC address of the multicast packet, when node 5 receives a packet from node 4 it will see node 4's MAC address in the Source Address field. Since node 5 expects to receive packets from node 4 on the port connecting node 5 to node 4, the incorrectly forwarded Link Trace Message from node 4 will pass RPFC on node 5. Hence, nodes that implement RPFC based on the source address will not squelch erroneous transmission of link trace messages, which results in an inability to properly trace a multicast tree through the network. Accordingly, it would be advantageous to provide an alternative manner of implementing multicast link trace connectivity fault management in an Ethernet network.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

Multicast link trace Connectivity Fault Management (CFM) is implemented in an Ethernet network by causing nodes on the network which perform Reverse Path Forwarding Check (RPFC) based on packet Source Address (SA) to not update the packet SA when updating the content of the CFM message. Alternatively multicast CFM is implemented by causing nodes on the network to update the packet SA when the content of the CFM message is updated, but cause a secondary RPFC process to be implemented by a control process in connection with processing the CFM message. The secondary RPFC process is based on a combination of source and content contained in the payload of the CFM message.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
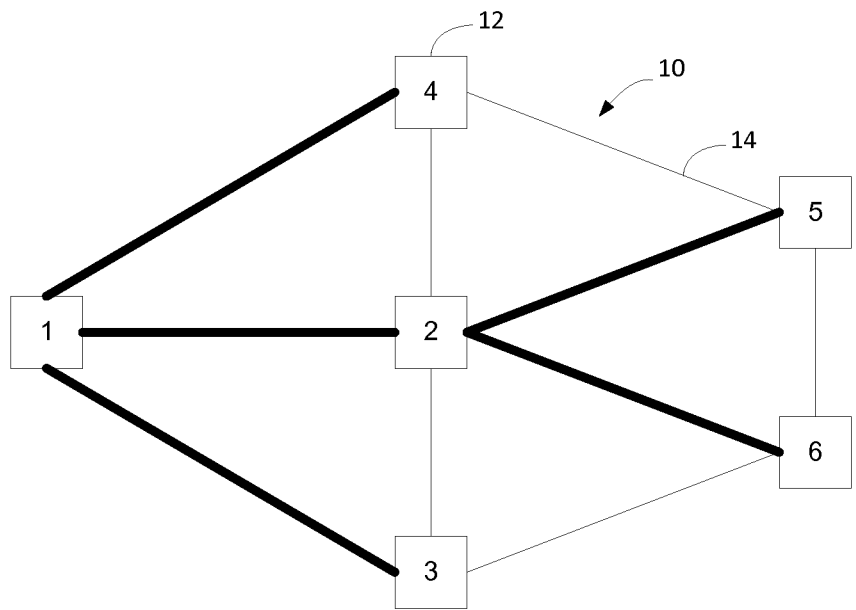
FIGS. 1-4 are functional block diagrams of a portion of an example Ethernet network.
Figure 2:
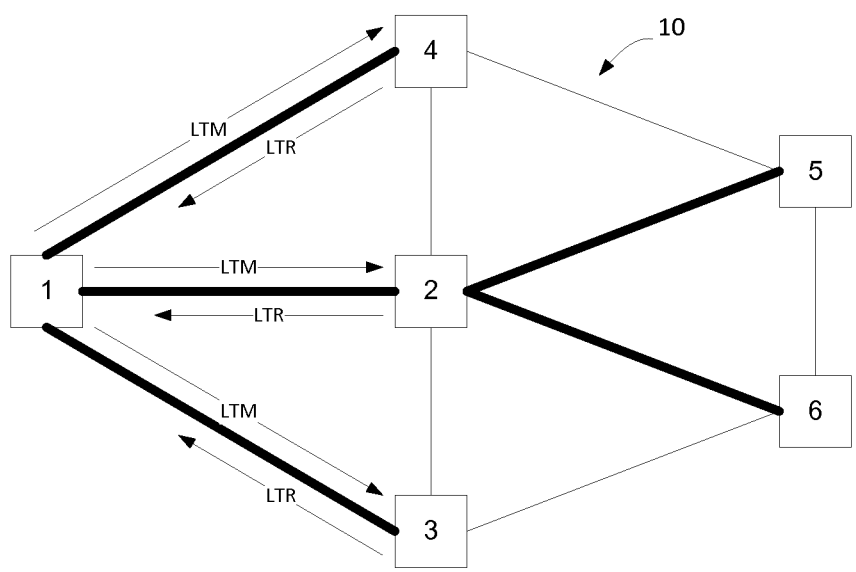
Figure 3:
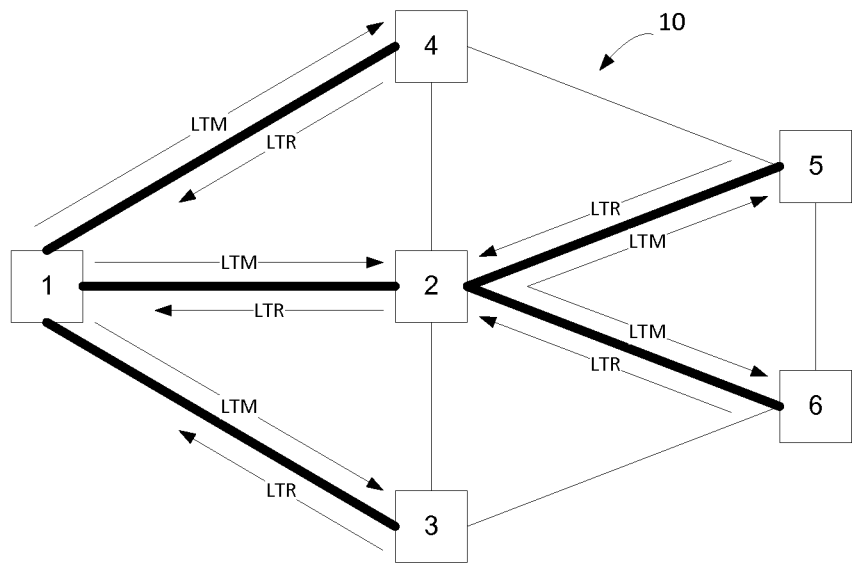
Figure 4:
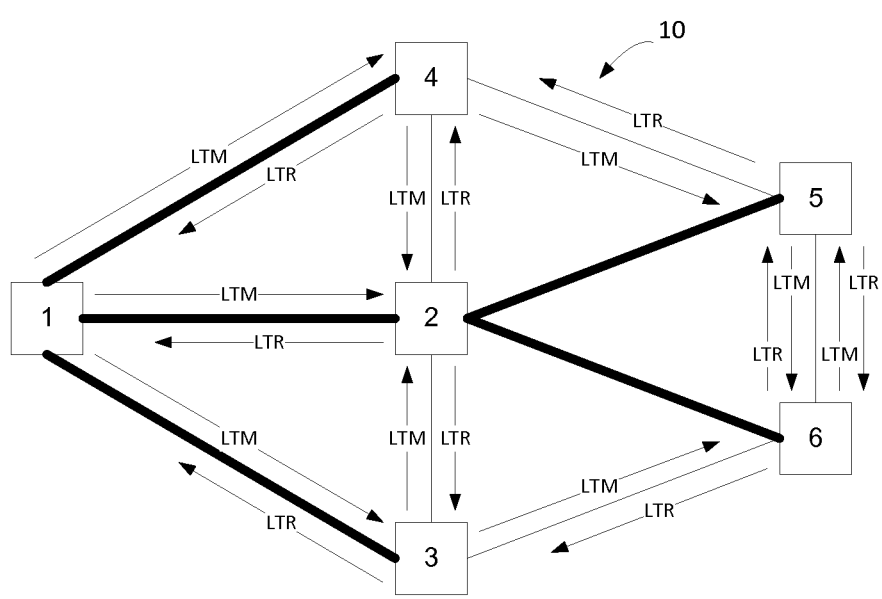

Nodes on a link state protocol controlled Ethernet network implement a link state routing protocol such as Intermediate System to Intermediate System (IS-IS). The nodes on the network learn adjacencies from the IS-IS Link State Advertisements (LSAs), also known as Link State Packets, and compute shortest paths between all pairs of nodes on the network. Each participating node populates its Forwarding Information Base (FIB) to construct unicast forwarding state between each pair of nodes on the network. Traffic engineered paths may also be constructed and forwarding state for the TE paths is installed into the nodes' FIBs on the network.

IS-IS permits topology information and the bindings of layer 2 and layer 3 addresses to specific network locations and interfaces to be exchanged independent of the switching or forwarding technology used in specific network elements. This facilitates two things, the first is that the topology considered by the IS-IS computation is similarly independent of the actual switching or forwarding employed, and secondly that that the construction of a network within a common IS-IS domain may be a concatenation of switching technologies such as Ethernet and MPLS, IPv4 or IPv6. The routing system may determine shortest paths across the network that transit multiple forwarding paradigms. The result is a system with routing domains (the set of network nodes participating in an instance of a routing protocol) that may encompass one or more Ethernet switching domains. One degenerate case is the complete congruence of a routing domain and a switching domain, another is the current status quo where all nodes in the routing domain perform forwarding at layer 3 and Ethernet is only employed as a link technology.

In a multicast context, the nodes in a switched domain may be configured to install forwarding state for a network layer multicast group if they are on a shortest path between two nodes that have advertised an interest in the same network layer multicast group address. A network layer multicast information element, such as a Type Length Value tuple (TLV), may be added to IS-IS to enable nodes on the link state protocol controlled Ethernet network to advertise interest in an IP multicast in a link state advertisement. Similarly an algorithmic or administered translation of network layer multicast to an I-SID value may be employed such that existing link state bridging add/move/change procedures will also handle multicast routing across a given switched domain. When a node issues a link state advertisement containing a multicast address, the nodes will update their link state database to indicate the multicast group membership. The nodes will also determine if they are an intermediate node on a path between a multicast source and a node advertising an interest in the multicast (destination or Group node). If so, the intermediate node will install forwarding state for a multicast DA associated with the multicast group so that the link state protocol controlled Ethernet network may provide transport services for the multicast.

When a multicast packet is received at an ingress to the link state protocol controlled Ethernet network, the ingress node performs a lookup process to determine the multicast DA to be used on the link state protocol controlled Ethernet network, and constructs a MAC header for the frames that will be used to carry the packet. The frames are then output with the multicast header to be forwarded by the intermediate nodes (using the FIB state installed for that multicast DA) to the nodes that have advertised interest in the multicast.

There are instances where it is desirable to trace an established multicast tree to determine whether the nodes on the network have properly installed forwarding state for the multicast tree. As noted above, multicast CFM may be used to implement this process. In multicast CFM, a link trace message will be addressed to the multicast DA associated with the tree, but have an EtherType indicating to the nodes (Messaging Intermediate Points—MIPs) on the network that the packet is associated with connectivity fault management. When the nodes receive a packet containing the CFM EtherType, the nodes process the packet by sending a unicast Link Trace Response to the originating node.

Figure 5:
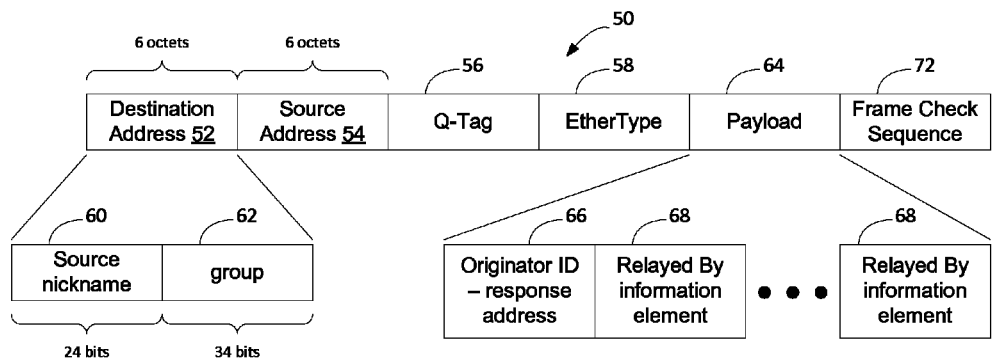
FIG. 5 is a functional block diagram showing an example Ethernet packet format.

FIG. 5 illustrates an example Link Trace Message format. As shown in FIG. 5, A Link Trace Message 50 has a standard Ethernet header including a Destination Address (DA) 52, Source Address (SA) 54, optional tag 56, and EtherType 58. Other Ethernet header formats exist and the example shown in FIG. 5 is merely one example header format. The multicast DA 52 identifies the multicast tree on the network to be traced. Nodes on the network have forwarding state for the multicast tree so that the CFM packets will be forwarded by the nodes according to the established forwarding state for the multicast DA.

As shown in FIG. 5, conventionally, a multicast Destination Address is created to encode a source nickname 60 (24 bits) and a group ID 62 (24 bits). As noted above, where a node is designed to perform RPFC based on the destination address, the source nickname and/or group ID can provide information enabling the node to determine whether the link trace message has arrived on an expected port for the identified multicast. Where the LTM arrives on an unexpected port, the RPFC process will cause the LTM to be dropped so that further propagation of the LTM on the network will be prevented.

However, not all nodes are able to perform RPFC in a multicast context based on the multicast destination address. Specifically, with unicast traffic, RPFC is conventionally based on the source address 54. Accordingly, many network elements have been implemented to perform RPFC for both unicast and multicast based on the source address by comparing whether a packet having the packet source address 54 arrived on an expected port for the source address. Where the packet arrived on an unexpected port, the RPFC process will cause the packet to be dropped.

In the example Link Trace Message shown in FIG. 5, the LTM includes a payload 64 which contains the originator ID 66 identifying the messaging end point (MEP) that originated the message. Nodes that receive the message will use this originator ID to generate a link trace response message and unicast the link trace response message to the originator.

The payload 64 also includes a set of "relayed by" information elements 68 indicating which nodes on the network have relayed the LTM. Each node that forwards the LTM will add a "relayed by" information element 68 to the LTM to enable other nodes to know that it has forwarded the LTM. This allows the path that the LTM followed through the network to be traced so that the branches of the multicast tree may be determined.

Figure 6:
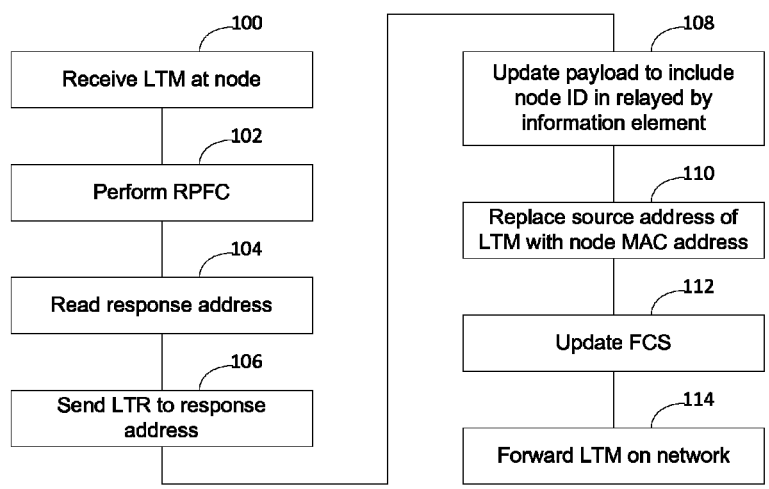
FIG. 6 is a flow chart of a method of forwarding link trace messages.

FIG. 6 shows a conventional process of updating a LTM. As shown in FIG. 6, when a node receives a LTM (100) it will perform RPFC (102) and read the response address 66 from the LTM payload (104). The node will send a LTR response to the response address (106) and update the payload to include the node ID in the relayed by information element 68 (108). The node will then replace the source MAC address 54 of the LTM with its MAC address to identify itself as the originator of the updated LTM message (110). The node will also update the Frame Check Sequence 72 (112) and forward the LTM message on the network (114). As noted above, this conventional process breaks down in situations where nodes implement RPFC based on the source address 54.

Figure 7:
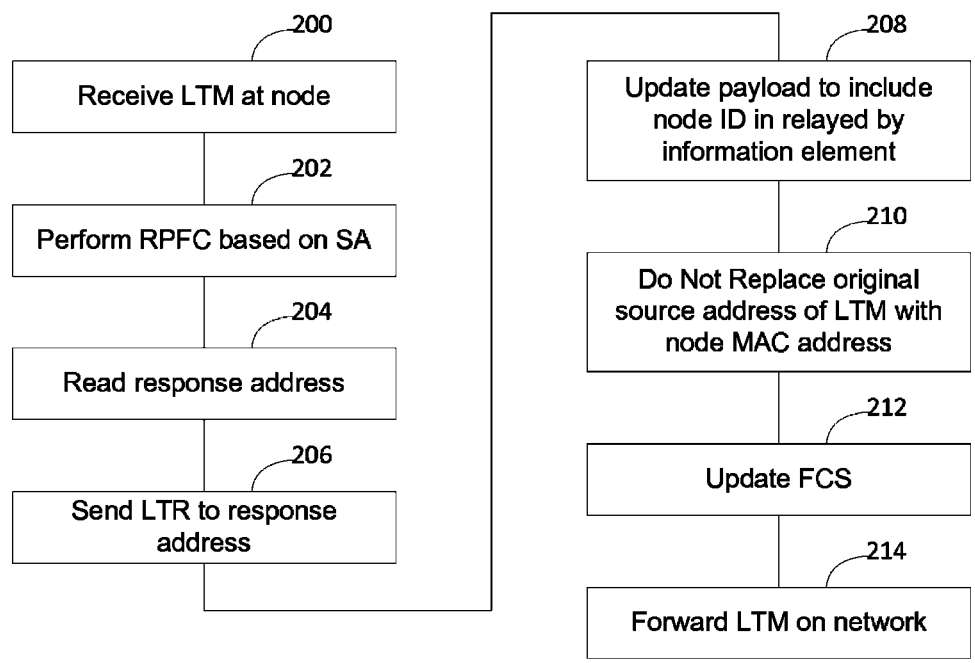
FIG. 7 is a flow chart of a method of implementing multicast link trace connectivity fault management in an Ethernet network according to a first embodiment.

FIG. 7 shows an alternative process of implementing link trace in an environment where nodes implement RPFC based on the source address 54. As shown in the embodiment of FIG. 7. When the node receives a Link Trace Message (200) the node will perform RPFC based on the source address 54 (202). If the LTM has arrived on an expected port for the SA 54, then the node will forward the LTM to its control plane for further processing. A link trace process 90 (see FIG. 9) in the control plane will read the response address 66 from the payload 64 (204) and send a link trace response (LTR) to the response address (206).

The payload will then be updated to include the node ID in a relayed by information element 68 (208). However, rather than replacing the original Source Address 54 with the source address of the node that has updated the LTM, the node will not replace the original source address of the LTM and will preserve the source MAC address 54 of the MEP that originated the Link Trace Message (210). The node will update the Frame Check Sequence (212) and forward the updated Link Trace Message on the network (214).

By preserving the originating MEP Source MAC Address 54 in the header of the Link Trace Message, subsequent nodes on the network (MIPs and MEPs) which perform RPFC based on the source address will discern the true origination of the LTM based on the frame header source address. Hence, the RPFC process will enable these subsequent nodes to determine whether the frame arrived on an expected port for multicast traffic originated by the originating MEP. This, in turn, enables LTMs to be handled properly on the network regardless of how the nodes perform RPFC. Also, since the payload includes an information element identifying which nodes have relayed the LTM, requiring an updating node to replace the original SA with the SA of the modifying node is not necessary to preserve information about which node most recently modified the frame prior to forwarding it on the network. However, the normal requirements of requiring a node that modifies a frame to include its address as the source address is not needed to enable the entity that modified packet to be determined, since the modification, in this instance, includes adding information about the modifying node in the payload.

Although not shown in FIG. 7, optionally a Time to Live (TTL) field may be included in the frame header or body, to enable the frame forwarding to have a limited scope on the network. Where the LTM frame includes a TTL field, the node may update (decrement) the TTL field as well prior to forwarding the frame on the network. The node will not update the SA in connection with decrementing the TTL field, as discussed above, to enable RPFC to be implemented on the frame in connection with preventing spurious transmission of LTM frames outside of the established multicast tree on the network.

Figure 8:
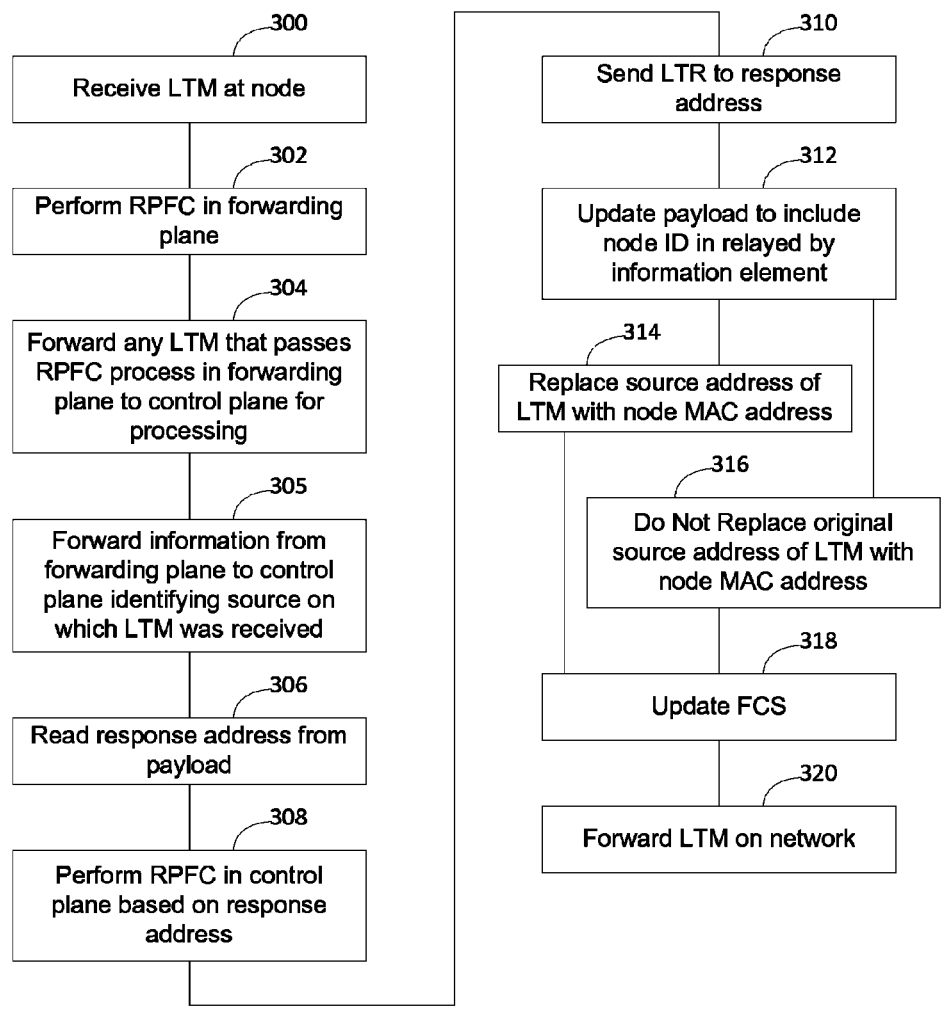
FIG. 8 is a flow chart of a method of implementing multicast link trace connectivity fault management in an Ethernet network according to a second embodiment.

FIG. 8 shows an alternative embodiment in which RPFC is implemented in the control plane as well as in the forwarding plane. As shown in FIG. 5, the LTM message includes the originator ID 66 in the payload portion 64 of the Ethernet frame. Likewise the source nickname is encoded into the destination address. The control plane can use these pieces of information to perform a secondary RPFC process where the frame passes RPFC in the forwarding plane to selectively drop LTM messages that pass RPFC in the forwarding plane.

As shown in FIG. 8, when a node receives an LTM (300) it will perform an RPFC process in the forwarding plane (302). For purposes of this embodiment, the forwarding plane based RPFC check may be based on either the multicast destination address 52 or the source address 54. As noted above, basing RPFC on the source address may cause link trace messages to incorrectly pass RPFC because of the SA substitution normally implemented when a node updates the content of the Ethernet frame. In this embodiment, all packets which pass the RPFC process in the forwarding plane will be forwarded to the link trace process 90 in the control plane for further processing (304). The forwarding plane will also forward information to the control plane identifying the port, interface, or other source on which the link trace message was received (305).

The node will read the response address 66 from the payload 64 (306) and perform a secondary RPFC check based on the response address (308) and the information from the forwarding plane identifying the input port, interface, or other source on which the LTM was received. Alternatively the node can determine the LTM source by reading the multicast DA, when the multicast DA encodes the source, and determine if the LTM was received at an expected port for that source. This secondary control plane based RPFC enables the node to squelch LTM frames that incorrectly pass RPFC at the forwarding plane, for example in situations where the forwarding plane RPFC process is based on the source address 54 and the nodes on the network are updating the LTM source address as the LTM is forwarded through the network.

If the LTM passes the secondary RPFC process, the node will send a LTR to the response address (310) and update the payload to include the node ID in the relayed by information element 70 (312). In this embodiment, the node may either update the source address in connection with changing the payload (314) or not update the source address 54 in connection with changing the payload (316). The node will also update the FCS (318) and forward the LTM on the network (320). Updating the source address has the advantage of being compliant with 802.1 whereas not updating the source address has the advantage of enabling source address based RPFC to be used by subsequent nodes to drop the packet without requiring the LTM frame to be processed at the control plane.

In this embodiment, the step of forwarding the Link Trace Message on the network (320) may occur before the step of performing secondary RPFC (308) or after. If the step of forwarding (320) is performed before the secondary RPFC process is performed, the LTM will continue to propagate on the network. If, alternatively, the step of forwarding (320) is performed after the secondary RPFC process is performed, propagation of the LTM will be slowed but incorrect forwarding of LTMs will be squelched where the LTM fails the secondary RPFC process. In either embodiment, the node will not generate LTRs to effectively reduce the number of response messages. Performing the forwarding step after the secondary RPFC processing step has the further advantage of also squelching transmission of the LTM rather than just squelching transmission of LTRs. Where the step of forwarding the LTM message (320) occurs before the secondary RPFC process has completed, preferably a time to live counter is decremented prior to forwarding the LTM message to limit the number of times the LTM message is forwarded on the network.

Figure 9:
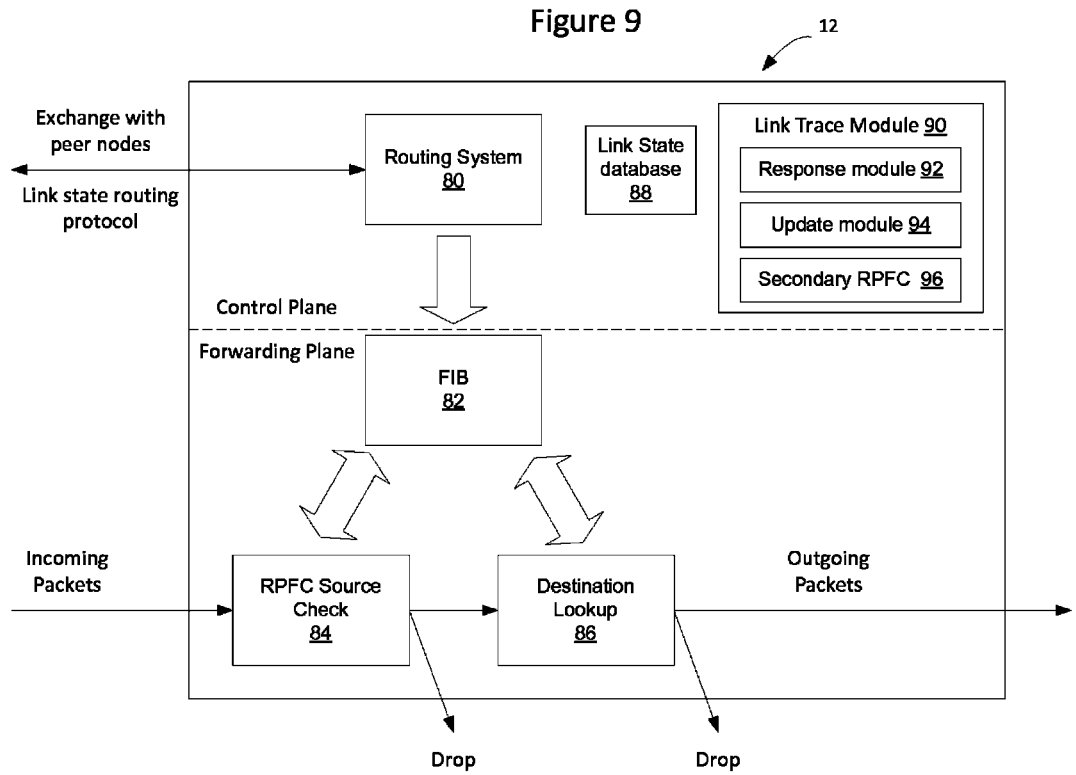
FIG. 9 is a functional block diagram of a network element configured to implement multicast link trace connectivity fault management in an Ethernet network according to the method of FIG. 7 or FIG. 8.

FIG. 9 is a schematic representation of a possible implementation of a network element 12 configured to be used in a link state protocol controlled Ethernet network. The network element 12 includes a routing system module 80 configured to exchange control messages containing routing and other information with peer network elements 12 in the network 10 regarding the network topology using a link state routing protocol. Information received by the routing system 80 may be stored in a link state database 88 or in another manner. As discussed previously, the exchange of information allows nodes on the network to generate a synchronized view of the network topology, which then allows the routing system module 80 to calculate the shortest path forwarding state and multicast forwarding state which enables packets to be forwarded to other nodes on the network. The forwarding state calculated by the routing system 80 will be programmed into a Forwarding Information Base (FIB) 82, that is populated with the appropriate entries for directing traffic through the network based upon the calculated shortest paths, multicast trees, traffic engineered path entries, and based on other entries.

The network element 12 includes a forwarding plane which implements a Reverse Path Forwarding Check (RPFC) module 84 that may be used to process incoming frames and perform a lookup in the FIB 82 to determine if the port over which the frame was received coincides with the port identified in the FIB 82 for the particular Source MAC. Where the input port does not coincide with the correct port identified in the FIB, the RPFC module will cause the frame to be dropped. As noted above, the RPFC module 84 may also be implemented to perform RPFC based on multicast DA, however this type of RPFC is not susceptible to problems with falsely passing LTMs due to SA substitution and hence has not been discussed in great detail herein.

If the frame passes the RPFC 84 module, a destination lookup 86 module determines from the FIB 82 the port or ports over which the frame should be forwarded. If the FIB doesn't have an entry for the DA/VID, the frame is discarded.

A link trace module 90 processes link trace messages. The link trace module 92 includes a response module 92 to respond to link trace messages by generating and forwarding link trace response messages. The link trace module 90 also includes an updating module 94 to update the payload 64 of the link trace messages before forwarding the link trace messages on the network. The link trace module may also include a secondary RPFC module 96 to perform a control-plane based RPFC process as described above in connection with FIG. 8 based on the originator ID 66 contained in the payload 64 or the multicast DA and source information indicating the input port, interface, or other source where the packet was received at the forwarding plane of the network element.

It should also be understood that the modules described are for illustrative purposes only and may be implemented by combining or distributing functions among the modules of a node as would be understood by a person of skill in the art.

The functions described above may be implemented as a set of program instructions that are stored in a tangible non-transitory computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible non-transitory computer readable medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing multicast link trace connectivity fault management in an Ethernet network, the method comprising:
    receiving, at a first node, a connectivity fault management link trace message sent by a second node;
    updating a payload portion of the connectivity fault management link trace message with an identifier of the first node to create an updated connectivity fault management link trace message; and
    forwarding, by the first node, the updated connectivity fault management link trace message to a third node without updating a source address of the updated connectivity fault management link trace message.

2. The method of claim 1, wherein the step of receiving the connectivity fault management link trace message by the first node comprises performing a reverse path forwarding check to determine whether the connectivity fault management link trace message arrived on an expected port for the source address of the connectivity fault management link trace message.

3. The method of claim 2, wherein the step of performing a reverse path forwarding check is implemented in a forwarding plane by comparing a port on which the connectivity fault management link trace message was received with the expected port;
    the method further comprising the steps of:
        passing the connectivity fault management link trace message and information about the port on which the connectivity fault management link trace message was received to a control process; and
        performing a secondary reverse path forwarding check in the control process by determining a source of the connectivity fault management link trace message and comparing the information about the port on which the connectivity fault management link trace message was received with expected port information for the source of the connectivity fault management link trace message.

4. The method of claim 3, wherein the source information of the connectivity fault management link trace message is determined by reading source information contained in the payload portion of the connectivity fault management link trace message.

5. The method of claim 4, wherein the source information is an originator ID response address.

6. The method of claim 3, wherein the source information of the connectivity fault management link trace message is determined by reading a multicast destination address encoding information about the source of the connectivity fault management link trace message.

7. The method of claim 3, wherein the connectivity fault management link trace message includes a time to live field, the method further including decrementing the time to live field prior to forwarding the updated connectivity fault management link trace message.

8. The method of claim 3, wherein forwarding occurs before performing the secondary reverse path forwarding check in the control process.

9. The method of claim 3, wherein forwarding occurs after performing the secondary reverse path forwarding check in the control process.

10. The method of claim 9, forwarding occurs only if the connectivity fault management link trace message passes the secondary reverse path forwarding check in the control process.

11. The method of claim 1, wherein the source address is a field of a header of the connectivity fault management link trace message identifying a source MAC address of a node that originated the connectivity fault management link trace message.

12. The method of claim 1, wherein the payload portion of the connectivity fault management link trace message includes information identifying a node that originated the connectivity fault management link trace message, the method further comprising generating and transmitting a Link Trace Response (CFR) message to the node that originated the connectivity fault management link trace message.

13. The method of claim 1,
wherein the payload portion of the connectivity fault management link trace message includes a set of relayed by information elements, and
wherein the step of updating the payload portion of the connectivity fault management link trace message comprises adding a relayed by information element identifying the first node.

14. The method of claim 13, wherein the relayed by information elements enables a set of nodes that have relayed the connectivity fault management link trace message to be determined.

15. The method of claim 1, wherein the connectivity fault management link trace message includes a time to live field, the method further including decrementing the time to live field prior to forwarding the updated connectivity fault management link trace message.

16. A network element, comprising:
a memory device storing executable instructions; and
a processor in communication with the memory device,
wherein executing the executable instruction by the processor causes the processor to:
provide a forwarding plane configured to implement a Reverse Path Forwarding Check (RPFC) on multicast packets based on a corresponding source address of each of the multicast packets;
wherein each of the multicast packets comprises a respective connectivity fault management link trace message; and
update connectivity fault management link trace messages by adding network element identification information to each of the respective connectivity fault management link trace messages;
wherein the forwarding plane is further configured to forward the updated connectivity fault management link trace messages without changing the source addresses of the updated connectivity fault management link trace messages.

17. The network element of claim 16, wherein the RPFC enables the network element to determine whether the multicast packets arrived on respective expected ports.

18. The network element of claim 16, wherein executing the executable instructions by the processor causes the processor to:
decrement time to live fields of the connectivity fault management link trace messages prior to forwarding the updated connectivity fault management link trace messages.

* * * * *